United States Patent
Hong et al.

(10) Patent No.: US 9,678,570 B2
(45) Date of Patent: Jun. 13, 2017

(54) HAPTIC TRANSMISSION METHOD AND MOBILE TERMINAL FOR SAME

(75) Inventors: Hyunsun Hong, Seoul (KR); Sora Kang, Seoul (KR); Jaebong Lee, Yongin-Si (KR); Munchae Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/365,259

(22) PCT Filed: Dec. 15, 2011

(86) PCT No.: PCT/KR2011/009666
§ 371 (c)(1),
(2), (4) Date: Jun. 13, 2014

(87) PCT Pub. No.: WO2013/089294
PCT Pub. Date: Jun. 20, 2013

(65) Prior Publication Data
US 2014/0333564 A1  Nov. 13, 2014

(51) Int. Cl.
*G06F 3/01* (2006.01)
*G06F 3/041* (2006.01)
*H04W 4/12* (2009.01)
*H04W 4/20* (2009.01)

(52) U.S. Cl.
CPC ............ *G06F 3/016* (2013.01); *G06F 3/041* (2013.01); *H04W 4/12* (2013.01); *H04W 4/206* (2013.01)

(58) Field of Classification Search
CPC . G06F 3/041; G06F 3/01; G06F 3/016; G06F 3/04883; G06F 3/044; G06F 3/0444; G06F 3/048
See application file for complete search history.

(56) References Cited

U.S. PATENT DOCUMENTS

| | | | |
|---|---|---|---|
| 2005/0037734 A1* | 2/2005 | Tanaka | H04M 1/72533 455/411 |
| 2006/0025220 A1* | 2/2006 | Macauley | A63F 13/12 463/42 |
| 2008/0218490 A1* | 9/2008 | Kim | G06F 3/0488 345/173 |
| 2008/0259045 A1* | 10/2008 | Kim | G06F 3/0486 345/173 |

(Continued)

FOREIGN PATENT DOCUMENTS

| | | |
|---|---|---|
| KR | 10-2008-0058124 A | 6/2008 |
| KR | 10-2010-0121053 A | 11/2010 |

(Continued)

*Primary Examiner* — Md Saiful A Siddiqui
(74) *Attorney, Agent, or Firm* — Birch, Stewart, Kolasch & Birch, LLP

(57) ABSTRACT

The present invention relates to a haptic transmission method. The haptic transmission method includes the steps of: a mobile terminal at a transmitting side displaying a screen capable of receiving an input for a receiver; when an input of selection for the receiver is completed, displaying a screen capable of receiving content to be transmitted; and when an impact or a touch input is detected after the screen display, generating a vibration pattern signal on the basis of the detected impact or the detected touch input and transmitting a message including the vibration pattern signal.

15 Claims, 26 Drawing Sheets

(56) References Cited

U.S. PATENT DOCUMENTS

| | | | | |
|---|---|---|---|---|
| 2008/0287147 A1* | 11/2008 | Grant | .................... | G06F 1/1626 |
| | | | | 455/466 |
| 2009/0021473 A1* | 1/2009 | Grant | .................... | G06F 3/016 |
| | | | | 345/156 |
| 2009/0325645 A1* | 12/2009 | Bang | ................... | G06F 3/016 |
| | | | | 455/566 |
| 2009/0325647 A1* | 12/2009 | Cho | ................ | H04M 1/72519 |
| | | | | 455/567 |
| 2010/0285784 A1 | 11/2010 | Seo et al. | | |
| 2010/0321312 A1* | 12/2010 | Han | ................... | G06F 1/1694 |
| | | | | 345/173 |
| 2011/0053641 A1* | 3/2011 | Lee | ................... | G06F 1/1626 |
| | | | | 455/556.1 |
| 2011/0285645 A1* | 11/2011 | Cho | .................... | G06F 3/0416 |
| | | | | 345/173 |
| 2013/0227411 A1* | 8/2013 | Das | ................. | H04M 3/42042 |
| | | | | 715/702 |

FOREIGN PATENT DOCUMENTS

| | | |
|---|---|---|
| KR | 10-2011-0020131 A | 3/2011 |
| KR | 10-2011-0026362 A | 3/2011 |
| KR | 10-2011-0041065 A | 4/2011 |

* cited by examiner

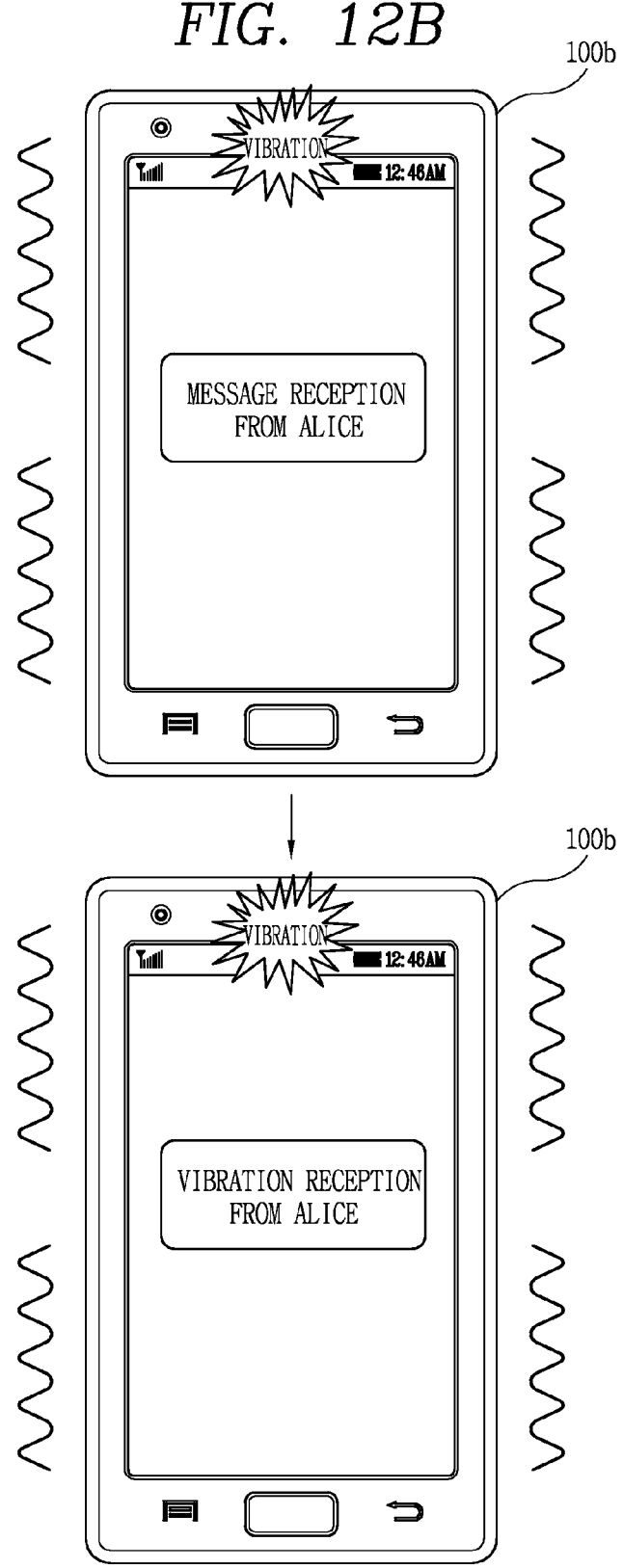

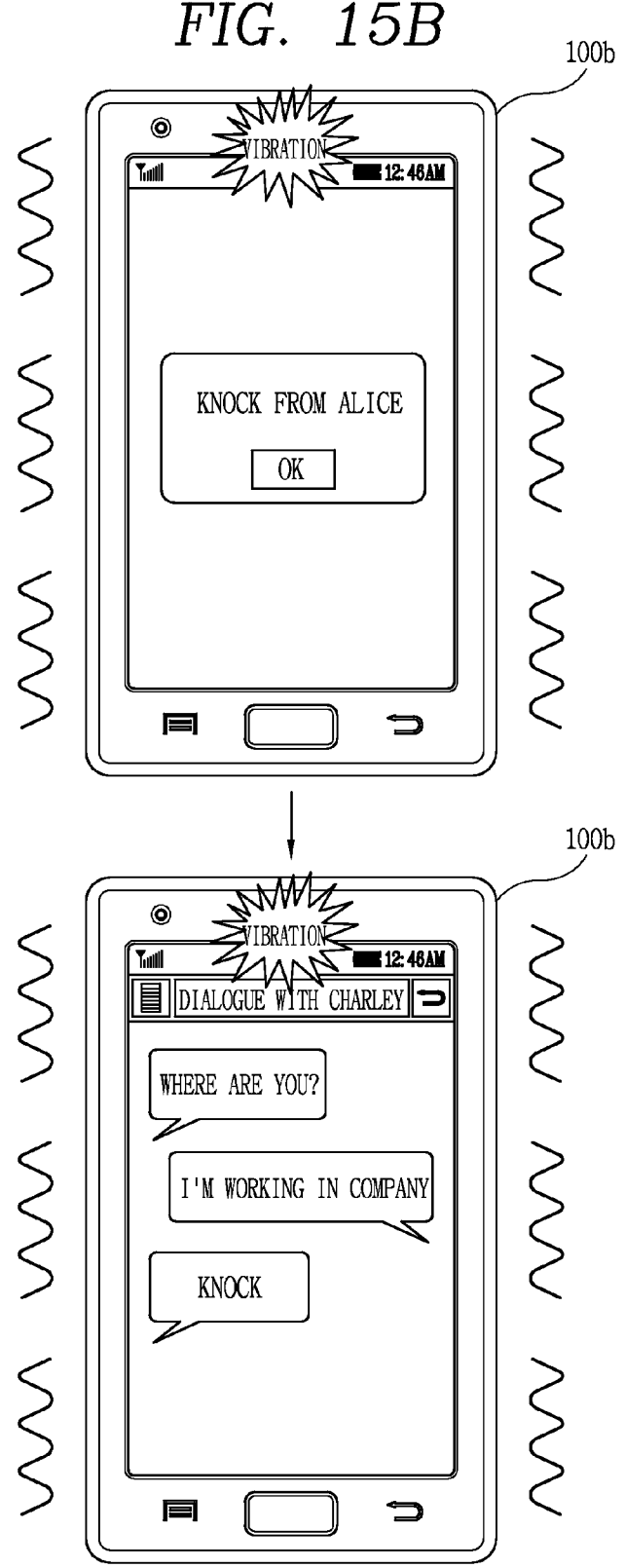

HAPTIC TRANSMISSION METHOD AND MOBILE TERMINAL FOR SAME

TECHNICAL FIELD

The present invention relates to a haptic transmission method.

BACKGROUND ART

Manufacturers for electronic devices are making an effort to fabricate an interface of high quality for a user. The conventional devices use video or audio signals so as to provide feedback to users. In some interface devices, a kinesthetic feedback (e.g., active feedback, resistive force feedback, etc.) and/or a tactile feedback (e.g., vibration, texture, heat, etc.) are provided to a user. Such feedbacks are generally known as "haptic feedback".

The haptic feedback may provide signals for enhancing and simplifying a user interface. More specifically, vibration effects or vibrotactile haptic effects may be useful in notifying a specific event or informing a specific event to a user of an electronic device. Also, the haptic effects may provide a substantial feedback such that greater sensory immersion is generated in a simulated environment or a virtual environment.

Cellular phones, personal digital assistants (PDAs), portable game terminals, and various types of electronic devices each providing haptic feedback are being actively utilized. For instance, some portable game applications may vibrate in a similar manner to a controller (e.g., joy stick) configured to provide a haptic feedback. Further, devices such as cellar phones and PDAs may provide various types of information to a user by vibration. For instance, a cellar phone may inform a user of a call received by vibration. Similarly, a PDA may inform a scheduled calendar item to a user by vibration, or may provide a user with "to do" list items or vibration reminders for calendar events.

DISCLOSURE OF THE INVENTION

In the conventional art, only a preset vibration is generated from a receiving side mobile terminal, and a vibration having a sender's desired pattern cannot be transmitted to a receiver.

Therefore, an object of the present invention is to provide a method of transmitting a sender's desired vibration pattern to a receiver.

To achieve these and other advantages and in accordance with the purpose of the present invention, as embodied and broadly described herein, there is provided a haptic transmission method, including: a transmitting side mobile terminal's displaying a screen for receiving an input of a receiver; when an input for selecting the receiver is completed, displaying a screen for receiving an input of content to be transmitted; and when an impact or a touch input is detected after the screen display, generating a vibration pattern signal on the basis of the detected impact or the detected touch input, and transmitting a message including the vibration pattern signal.

An indicator for emoticons may be displayed on the screen for receiving an input of content to be transmitted. When the indicator is touched, a plurality of emoticons may be displayed. Upon receipt of an input for selecting a specific emoticon among the plurality of emoticons, a vibration pattern signal may be generated based on the specific emoticon.

Upon receipt of an input for selecting the specific emoticon, an indicator for adjusting a vibration tempo and a vibration intensity according to the emoticon may be displayed. When a user inputs one of the vibration tempo and the vibration intensity, a vibration pattern signal may be generated based on the adjusted tempo and intensity, and then may be transmitted.

The impact detection may be performed by detecting an impact occurring when the transmitting side mobile terminal is shaken.

The impact detection may be performed by detecting an impact occurring when a user knocks on the transmitting side mobile terminal.

In the step of generating a vibration pattern signal on the basis of the touch input, if numeric keys or text keys are consecutively input, a vibration pattern signal corresponding to each of the input numeric or text keys may be generated.

In the step of generating a vibration pattern signal corresponding to each of the input numeric or text keys, a different vibration pattern signal may be generated according to whether an input text key is a consonant or a vowel, or a different vibration pattern signal may be generated according to a position of an input text key on a keypad, the position indicating a row and a column.

After displaying the screen for receiving an input of content to be transmitted, whether a user's facial expression has changed or not may be sensed by a camera. A vibration pattern signal indicating a user's feeling may be generated according to the change of facial expression, and may be transmitted.

According to another aspect of the present invention, there is provided a haptic transmission method, including: displaying a screen for transceiving a message with another party; when a knock signal is received from the other party, generating a vibration according to the knock signal; detecting an impact corresponding to a response knock to the received knock signal; and generating a vibration pattern signal such that the response knock is transmitted according to the detected impact, and transmitting the generated vibration pattern signal.

The step of detecting an impact may include: detecting consecutive impacts; checking whether a size difference between the consecutive impacts exceeds a preset threshold value; if the size difference between the consecutive impacts does not exceed the preset threshold value, determining the consecutive impacts as a knock.

To achieve these and other advantages and in accordance with the purpose of the present invention, as embodied and broadly described herein, there is also provided a mobile terminal, including: a touch screen configured to display a screen for inputting a receiver, and configured to display a screen for inputting content to be transmitted when an input of the receiver is completed; and a controller, if an impact or a touch input is detected after the screen display, configured to generate a vibration pattern signal on the basis of the detected impact or the detected touch input, and configured to transmit a message including the vibration pattern signal.

EFFECTS OF THE PRESENT INVENTION

An embodiment of the present invention has solved the aforementioned problems of the conventional art. That is, in an embodiment of the present invention, a haptic effect can be transceived (transmitted and received).

MODES FOR CARRYING OUT THE PREFERRED EMBODIMENTS

Figure 1A:
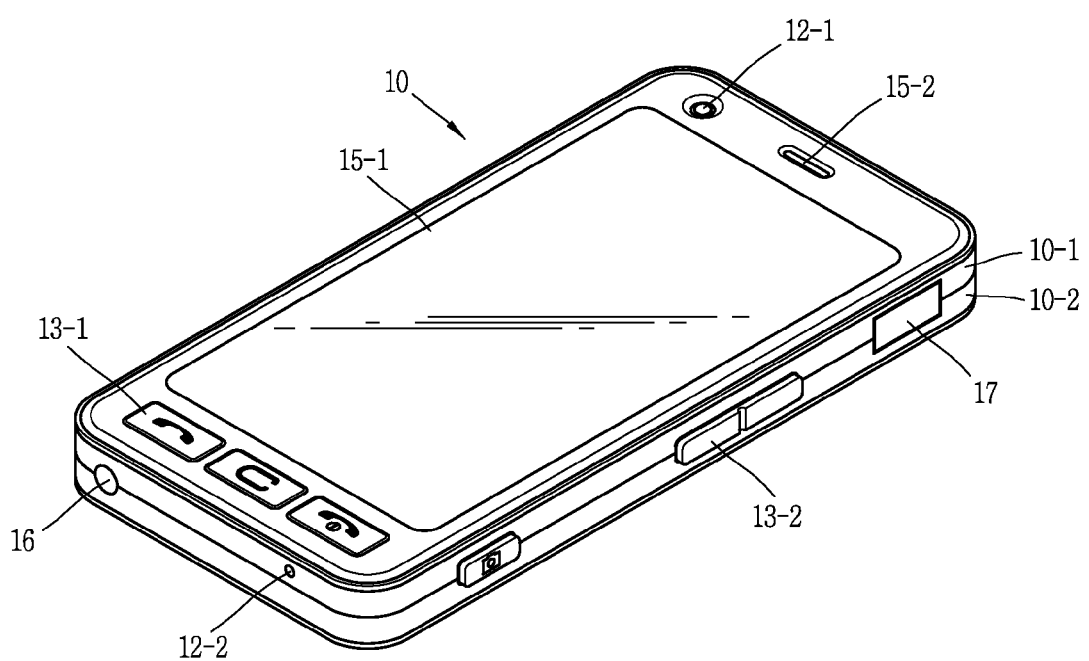
FIG. 1 is a view illustrating the appearance of a mobile terminal or a portable terminal according to the present invention.

Technical terms used in the present specification is only for describing specific embodiments and notably, is not intended to impose any limitation to the present invention. In addition, the technical terms used in the specification should be construed in such a manner that they are usually understandable to a person of ordinary skill in the art that the present invention pertains to, unless otherwise specifically defined in the present specification. The technical terms should not be construed too broadly or too narrowly. In addition, when the technical terms used in the present specification are ones that do not exactly express the idea of the present invention, they should be replaced with the ones fully understandable to a person of ordinary skill and be understood to that extent. In addition, general terms used in the present specification should be construed as defined in a dictionary or in the context and should not be construed too narrowly.

In addition, a word expressed in the singular, used in the present specification is construed as being in the plural, unless otherwise distinctively meant in the content. The expression "is configured form or includes constituent elements or steps," used in the present specification, should not be construed as including all of the constituent elements or all of the steps and should be construed in such a manner that, among all of the constituent elements or all of the steps, some of the constituent elements or some of the steps may not be included or additional constituent elements or additional steps may be further included.

The suffixes attached to components of the mobile terminal, such as 'module' and 'unit or portion' were used for facilitation of the detailed description of the present invention. Therefore, the suffixes do not have different meanings from each other.

In addition, the expressions that mean ordinal numbers in the specification, such as "first," "second," and the like, are used for describing various constituent elements without imposing any limitation to the various constituent elements. The expressions that mean the ordinal numbers are used only for distinguishing among the constituent elements of the same kind. For example, a first constituent element may be named a second constituent element without departing from scope of claims. Similarly, the second constituent element may be named the first constituent element.

Desirable embodiments according to the present invention are described referring to the accompanying drawings. Like constituent elements are given like reference numerals and a redundant description of the like constituent elements is omitted.

In addition, when it is determined that a detailed description of a technology known in the related art prevents the nature and gist of the present invention from being made apparent, the detailed description of the technology is omitted. In addition, the accompanying drawings are only for helping get an easy understanding of the idea of the present invention and notably, should not be construed as imposing any limitation on the idea of the invention.

FIG. 1 is a view illustrating the appearance of a mobile terminal or a portable terminal according to the present invention.

The mobile terminal 10 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 10 comprises a case (casing, housing, cover, etc.). In this embodiment, the case may be divided into a front case 10-1 and a rear case 10-2. A space formed by the front case 10-1 and the rear case 10-2 may accommodate various components therein. At least one intermediate case may further be disposed between the front case 10-1 and the rear case 10-2.

Such cases may be formed by injection-molded synthetic resin, or may be formed using a metallic material such as stainless steel (STS) or titanium (Ti).

A display module 15-1, an audio output unit 15-12, a camera 12, user input units 13/13-1, 13-2, a microphone 12-2, an interface unit 17, etc. may be disposed at the terminal body.

The display unit 15-1 occupies most parts of a main surface of the front case 10-1. The audio output unit 15-12 and the camera 12 are arranged at a region adjacent to one end of the display unit 15-1, and the user input unit 13-1 and the microphone 12-2 are arranged at a region adjacent to another end of the display unit 15-1. The user input unit 13-2, the interface unit 17, etc. may be arranged on side surfaces of the front case 10-1 and the rear case 10-2.

The user input unit 13 is manipulated to receive a command for controlling the operation of the mobile terminal 10, and may include a plurality of manipulation units 13-1 and 13-2. The manipulation units 13-1 and 13-2 may be referred to as manipulating portions, and may include any type of ones that can be manipulated in a user's tactile manner.

Commands inputted through the first user input unit 13-1 or the second user input unit 13-2 may be variously set. For instance, the first user input unit 13-1 is configured to input commands such as START, END and SCROLL, and the second user input unit 13-2 is configured to input commands for controlling a level of sound outputted from the audio output unit 15-2, or commands for converting the current mode of the display unit 15-1 to a touch recognition mode.

Figure 1B:
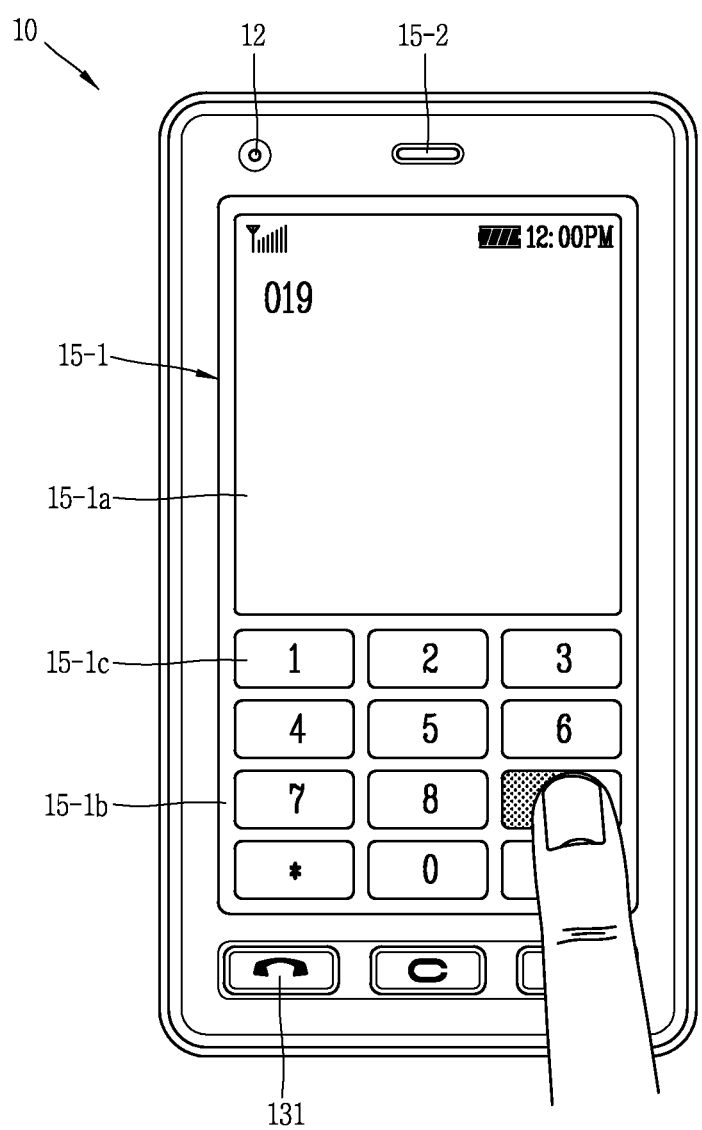

FIG. 1*b* is a front view of a mobile terminal for explaining an operation state of the mobile terminal according to the present invention.

Various types of visible information may be displayed on the display unit 15-1. Such information may be displayed in several forms, such as character, number, symbol, graphic, icon or the like. For input of the information, at least one of characters, numbers, graphics or icons may be arranged and displayed in a preset configuration, thus being implemented in the form of a keypad. Such keypad may be called 'soft key.'

FIG. 1*b* is a view illustrating input of a touch applied to the soft key through an entire surface of the terminal body.

The display unit 15-1 may be operated as a single entire region or by being divided into a plurality of regions. For the latter, the plurality of regions may cooperate with one another.

For example, an output window 15-1*a* and an input window 15-1*b* may be displayed at upper and lower portions of the display unit 15-1, respectively. The output window 15-*a* and the input window 15-1*b* are regions allocated to output or input information thereto, respectively. Soft keys 15-1*c* representing numbers for inputting telephone numbers or the like may be output on the input window 15-1*b*. When a soft key 15-1*c* is touched, a number or the like corresponding to the touched soft key is output on the output window 15-1*a*. Upon manipulating the first manipulation unit 13-1, a call connection for a telephone number displayed on the output window 15-1*a* is attempted.

Figure 2:
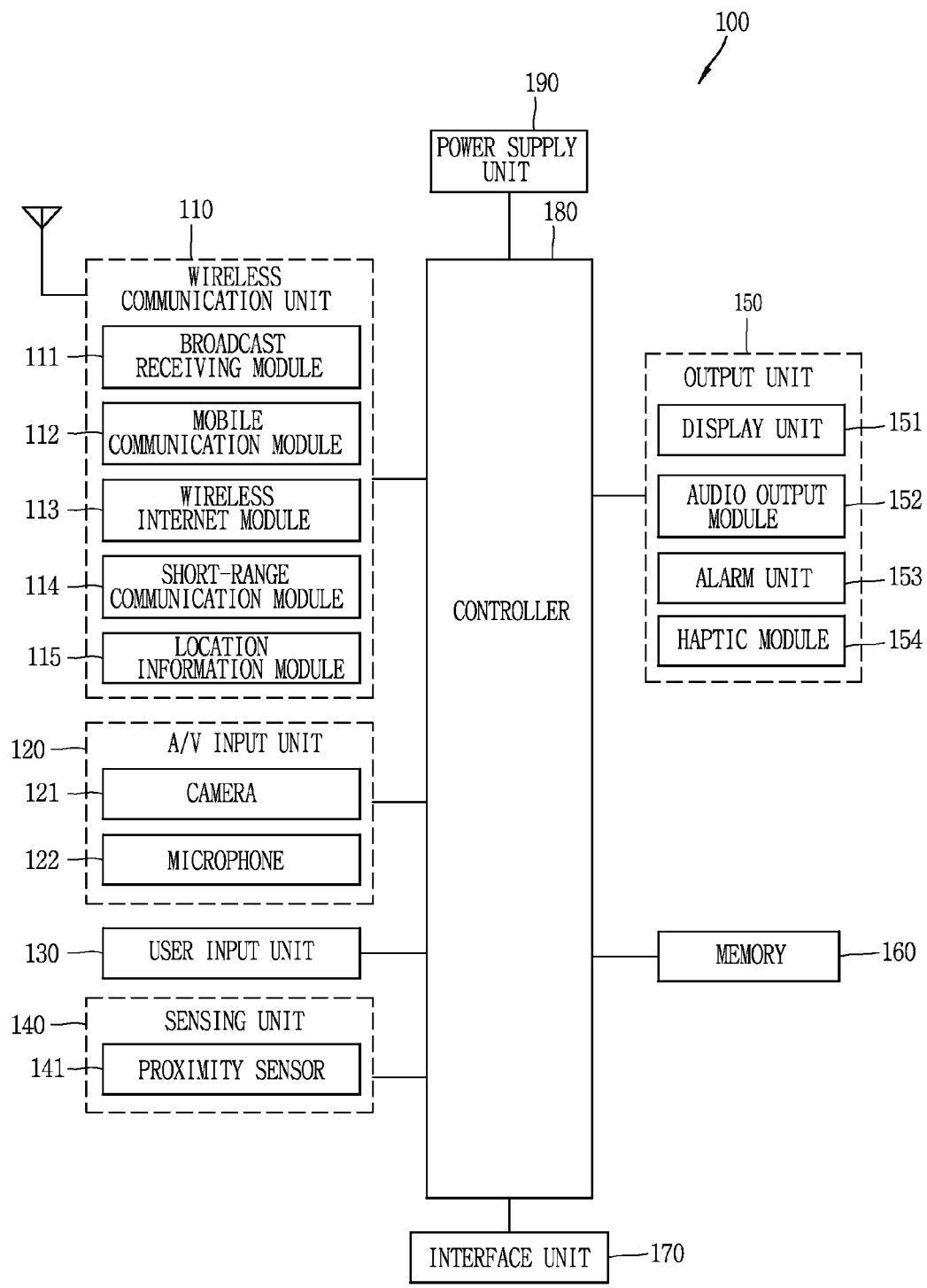
FIG. 2 is a block diagram illustrating an electronic configuration of a mobile terminal or a portable terminal according to the present invention.

FIG. 2 is a block diagram illustrating an electronic configuration of a mobile terminal or a portable terminal according to the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, etc. FIG. 2 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The camera 121 may include a first optical lens 121*a* and a second optical lens 121*b*. As aforementioned, the camera 121 may further include an exposure meter. Image frames processed by the camera 121 may be stored in the memory 160, or may be transmitted to outside through the wireless communication unit 110.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 150 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, a haptic module 155, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 2, a proximity sensor 141 may be arranged near the display unit 151. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, using vibration to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact Two or more haptic modules 154 may be provided according to the configuration of the mobile terminal 100.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like.

The power supply unit 190 receives external power or internal power and supplies appropriate power required for operating respective, elements and components under the control of the controller 180.

The aforementioned haptic module 154 may generate vibrations through the entire part of the mobile terminal 100, or through a part of the mobile terminal 100. Hereinafter, a case where the haptic module 154 generates vibrations through a part of the mobile terminal 100 will be explained.

Figure 3:
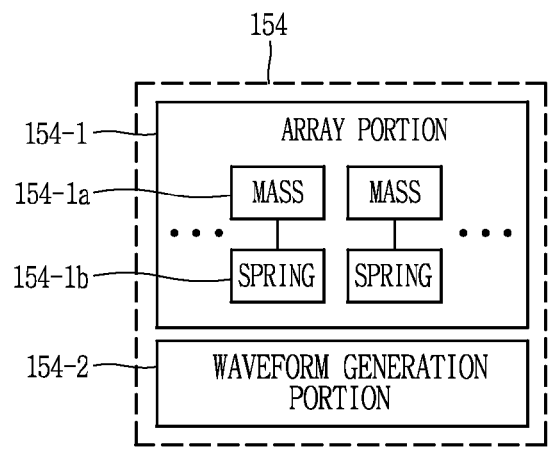
FIG. 3 is a view illustrating a detailed configuration of a haptic module 154 shown in FIG. 2.

FIG. 3 is a view illustrating a detailed configuration of the haptic module 154 shown in FIG. 2.

Referring to FIG. 3, the haptic module 154 may include an array portion 154-1 and a waveform generation portion 154-2.

The array portion 154-1 is configured to partially provide a haptic feedback by dividing the surface of the display unit 151 in an arbitrary form. The array portion 154-1 may be positioned on a rear surface of the display unit 151, on a front surface like the display unit 151, or on a side surface of the mobile terminal. Also, the array portion 154-1 may arrange a plurality of vibration application portions 154-1*a* included therein, in the form of an array, in correspondence to the display unit 151.

The array portion 154-1 may include a plurality of vibration application portions 154-1*a*, and a plurality of springs 154-1*b*. The array portion may be expressed as a mathematical model composed of a mass and a spring.

The plurality of vibration application portions 154-1*a* may be configured as small motors or vibration motors, etc, and may form a haptic feedback when converted into a vibration state from a non-vibration state. More specifically, upon detection of an input including a command for generating a haptic feedback on the display unit 151, the vibration application portions 154-1*a* which have been in a non-vibration state may be converted into a vibration state by a waveform generated by the waveform generation portion 154-2. The vibration application portions 154-1*a* which are in a vibration state may transmit a haptic feedback including at least one of vibration, sound, lamp flashing and heat, to outside.

Each of the plurality of vibration application portions 154-1*a* may have its own strength, and its own resonance frequency for making the vibration application portions 154-1*a* vibrate with a maximum amplitude. The waveform generation portion 154-2 may generate a waveform having an own resonance frequency in order to convert the vibration application portions 154-1*a* into a vibration state where they vibrate with a maximum amplitude.

The spring 154-1*b* may be configured as a spring having elasticity. And the spring 154-1*b* may be coupled to the vibration application portion 154-1*a*, so that the vibration application portion 154-1*a* can maintain a haptic feedback up and down or right and left, without being displaced from the original position.

The vibration application portions 154-1*a* and the springs 154-1*b* may constitute one spring-mass system, thereby generating a haptic feedback.

The waveform generation portion 154-2 is a microminiaturized device for generating a waveform, and is configured to generate a waveform having an arbitrary frequency. The waveform generation portion 154-2 may be implemented as a sonic wave output module or an ultrasonic wave output module, thereby generating a sonic wave or an ultrasonic wave. Alternatively, the waveform generation portion 154-2 may be implemented as a solenoid or an electromagnet, etc., thereby generating an electromagnetic wave, etc.

In a case where the waveform is an ultrasonic wave having directivity, the waveform generation portion 154-2 may generate a waveform with respect to a specific direction which is toward the array portion 154-1. In this case, the waveform generation portion 154-2 may be operated as an ultra directional waveform generation device.

In an embodiment of the present invention, if the waveform is a waveform having a high frequency (e.g., ultrasonic wave), the waveform generation portion 154-2 may generate two waveforms. Then the waveform generation portion 154-2 may convert the generated waveforms into a low frequency using a beat phenomenon. For this, the waveform generation portion 154-2 may be configured to generate a plurality of waveforms.

The waveform generation portion 154-2 may be positioned close to the vibration application portions 154-1*a*, and may be configured to convert the vibration application portions 154-1*a* which are in a non-vibration state into a vibration state. Also, the waveform generation portion 154-2 may generate a waveform having an own resonance frequency of the vibration application portion 154-1*a*, so that the vibration application portion 154-1*a* can be converted into a vibration state where it can vibrate with a maximum amplitude.

The frequency may be differently set with respect to driving a plurality of buttons, executing functions, or alarming events so as to provide different haptic feedbacks. Thus, the frequency may correspond to an own resonance frequency of a specific vibration application portion 154-1*a*, so that the plurality of vibration application portions 154-1*a* can selectively vibrate. The frequency may be preset or set by a user, and may be stored in the storage unit 160. The frequency may be stored in the storage unit 160 in the form of a look-up table, with respect to, each of the springs 154-1*b*. The frequency may be set to have a difference more than 10 Hz with respect to a neighboring vibration application portion.

Figure 4:
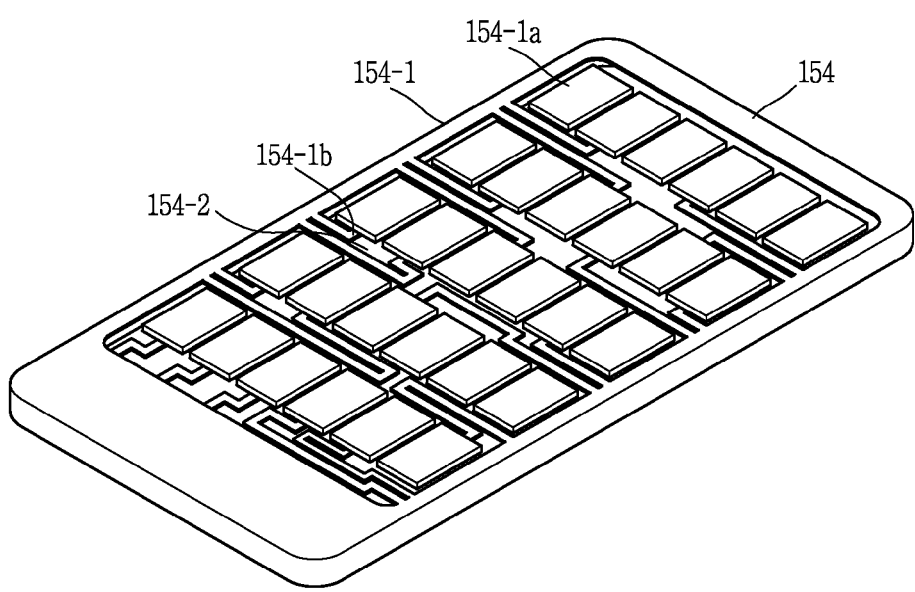
FIG. 4 is a view illustrating a configuration in a case where a haptic module of FIG. 3 has been implemented in the form of a pad.

FIG. 4 is a view illustrating a configuration in a case where a haptic module of FIG. 3 has been implemented in the form of a pad.

Referring to FIG. 4, the haptic module 154 may include the array portion 154-1 and the waveform generation portion 154-2. The array portion 154-1 may include the vibration application portions 154-1*a* and the springs 154-1*b*, thereby constituting one spring-mass system.

The waveform generation portion 154-2 may be positioned far from or close to the array portion 154-1, and may allow the array portion 154-1 to be in a partial vibration state.

Figure 5:
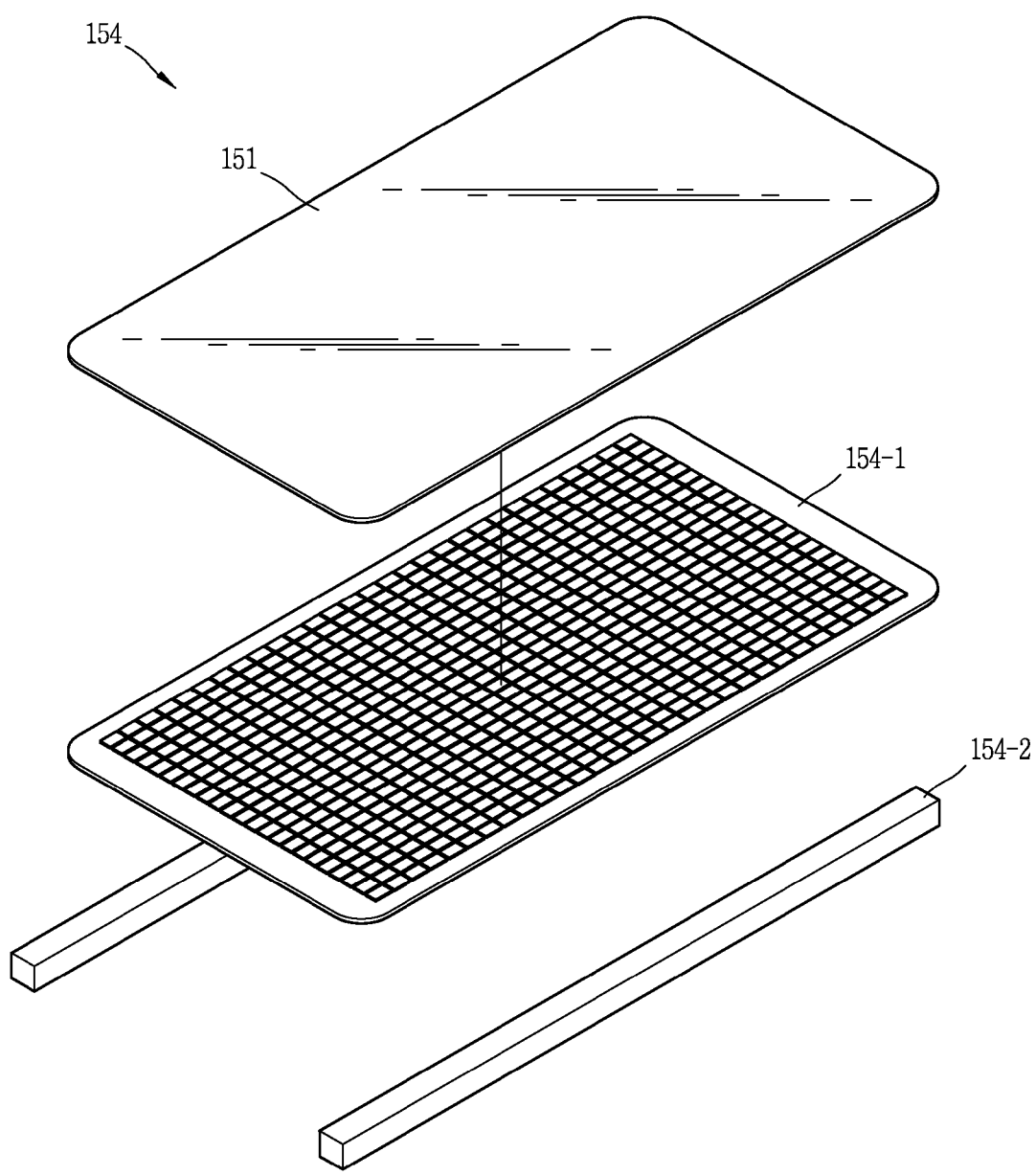
FIG. 5 is a view illustrating a configuration in a case where the haptic module of FIG. 3 has been implemented as a touch panel integrated-type haptic pad.

FIG. 5 is a view illustrating a configuration in a case where the haptic module of FIG. 3 has been implemented as a touch panel integrated-type haptic pad.

Referring to FIG. 5, the haptic module 154 may include the array portion 154-1, the waveform generation portion 154-2, and a touch panel 1231.

The touch panel 1231 may be provided with the touch sensor 123 for sensing a touch operation, thereby detecting a touch input. The touch input detected by the touch panel 1231 may be an input including a command for generating a haptic feedback.

The touch panel 1231 may have a layered structure with the display unit 151. In this case, the display unit 151 may display a plurality of buttons, and function or event-related haptic feedback UI.

Upon detection of a touch input by the touch panel 1231, the waveform generation portion 154-2 generates a waveform having a frequency corresponding to the detected input, so as to generate a haptic feedback according to the detected input.

The array portion 154-1 may be positioned in parallel to the waveform generation portion 154-2, thereby being converted into a vibration state by a frequency of a waveform generated by the waveform generation portion 154-2. Among the plurality of vibration application portions 154-1*a* of the array portion 154-1, only a vibration application portion 154-1*a* which has an own resonance frequency corresponding to a frequency of a waveform generated by the waveform generation portion 154-2, may be selectively converted into a vibration state.

Hereinafter, a haptic transmission/reception method using the haptic module 154 will be explained.

Figure 6:
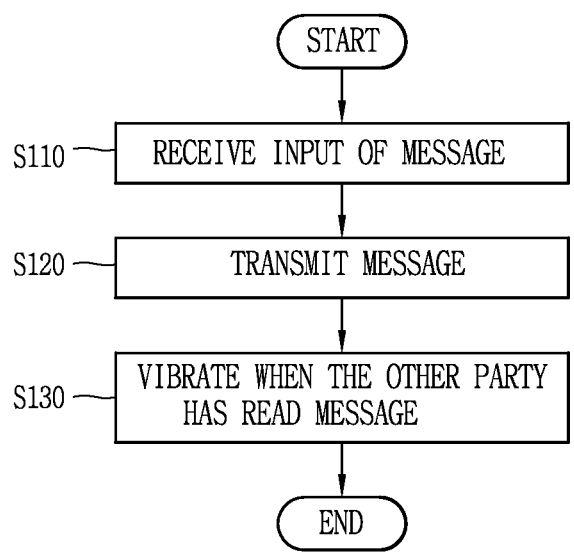
FIG. 6 is a flowchart illustrating a haptic effect transmission method according to a first embodiment of the present invention.

FIG. 6 is a flowchart illustrating a haptic effect transmission method according to a first embodiment of the present invention, and FIG. 7 is an exemplary view illustrating an example of the haptic effect transmission method of FIG. 6.

Referring to FIG. 6 according to a first embodiment of the present invention, once a message is read by another party, a vibration is transmitted to a sender.

More specifically, a transmitting side mobile terminal displays, on the display unit 151, icons for applications such as an icon for a mail application, an icon for a message service, and an icon for a clock application. If a touch to the icon for a message service is input from a user (e.g., Alice), the transmitting side mobile terminal checks whether a message application was being executed. If the message application was being executed, the transmitting side mobile terminal displays a previously-displayed screen. On the other hand, if the message application was not being executed, the transmitting side mobile terminal displays a new screen. The previously-displayed screen may be a screen where messages transceived (transmitted and received) with a receiver are displayed. Alternatively, the new screen may be a screen where a list of messages is displayed. Upon receipt of a touch input for writing a new message from a user, the transmitting side mobile terminal displays a screen for receiving content of a message or a receiver's number from the user.

After receiving, from the user (i.e., Alice), content of a message or a receiver (e.g., Charley)'s number on the screen (S110), the transmitting side mobile terminal transmits a message (S120).

Figure 7A:
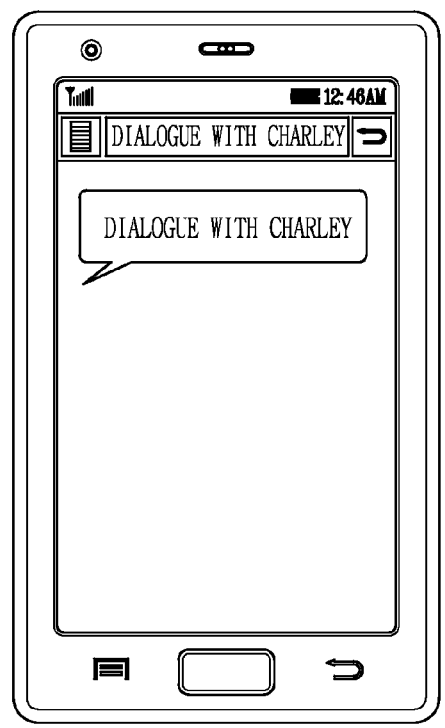
FIG. 7 is an exemplary view illustrating an example of the haptic effect transmission method of FIG. 6.

The transmitting side mobile terminal displays the transmitted message as shown in FIG. 7*a*.

A receiving side mobile terminal displays reception of the message on a screen, and generates an alarm (e.g., sound or vibration). If the receiving side mobile terminal's user inputs an operation to check the received message, the receiving side mobile terminal transmits a signal indicating that the receiving side mobile terminal's user has read the message.

Figure 7B:
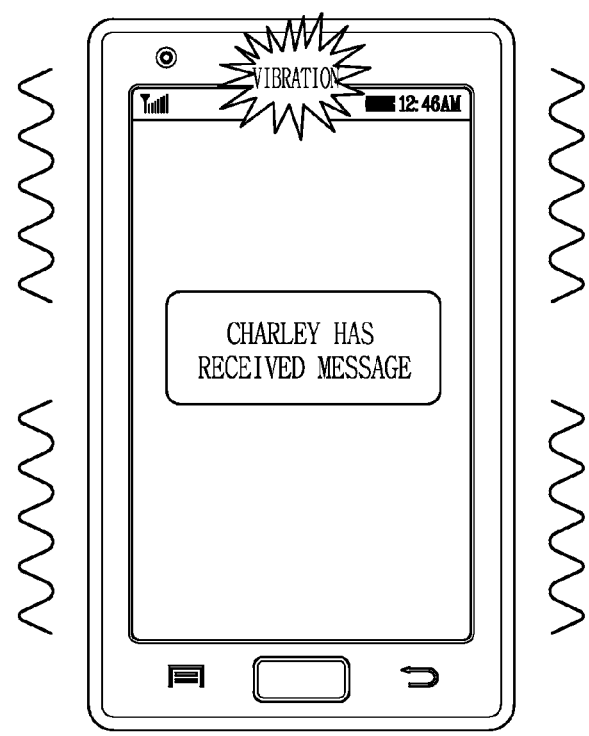
Figure 7C:
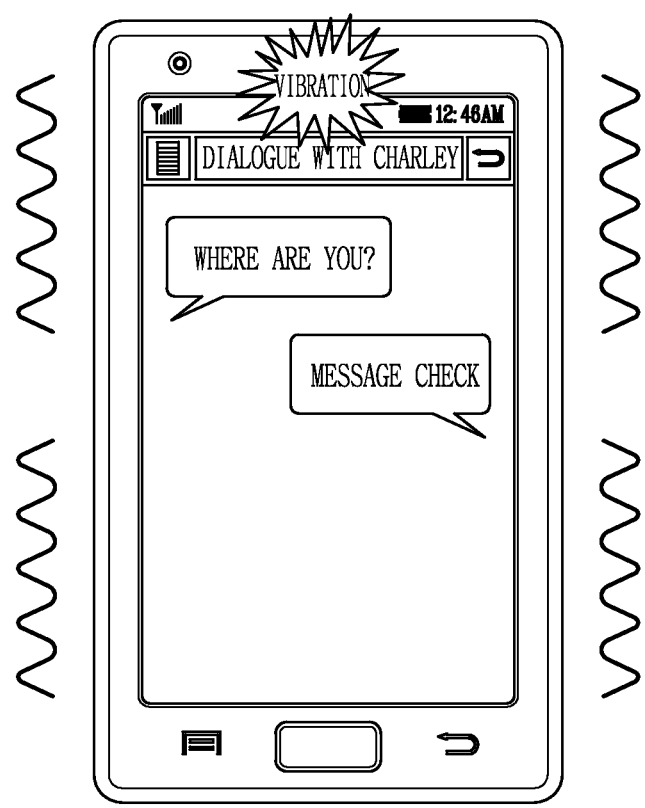

Upon receipt of the signal indicating that the receiving side mobile terminal's user has read the message, the transmitting side mobile terminal generates a vibration (S130). In a case where the message application screen has been terminated according to a user's request after the message transmission, the transmitting side mobile terminal may generate the vibration, together with content indicating that the other party (e.g., Charley) has received the message, as shown in FIG. 7*b*. On the other hand, in a case where the message application screen has not been terminated after the message transmission, the transmitting side mobile terminal may generate the vibration, together with content indicating that the other party has checked the message as shown in FIG. 7*c*.

Figure 8:
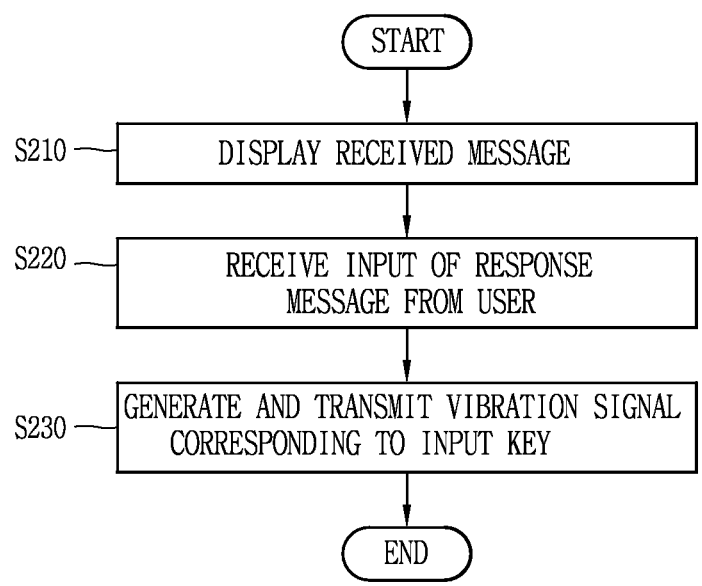
FIG. 8 is a flowchart illustrating a haptic effect transmission method according to a second embodiment of the present invention.

FIG. 8 is a flowchart illustrating a haptic effect transmission method according to a second embodiment of the present invention, and FIG. 9 is an exemplary view illustrating an example of the haptic effect transmission method of FIG. 8.

Referring to FIG. 8 according to the second embodiment of the present invention, a receiving side mobile terminal displays a received message. Then when requested to write a response message from a user, the receiving side mobile terminal displays a soft keypad on the display unit 151. Upon receipt touch inputs to the soft keypad from the user, the receiving side mobile terminal generates a vibration pattern signal corresponding to each of the touch inputs, and transmits the generated vibration pattern signal.

Figure 9A:
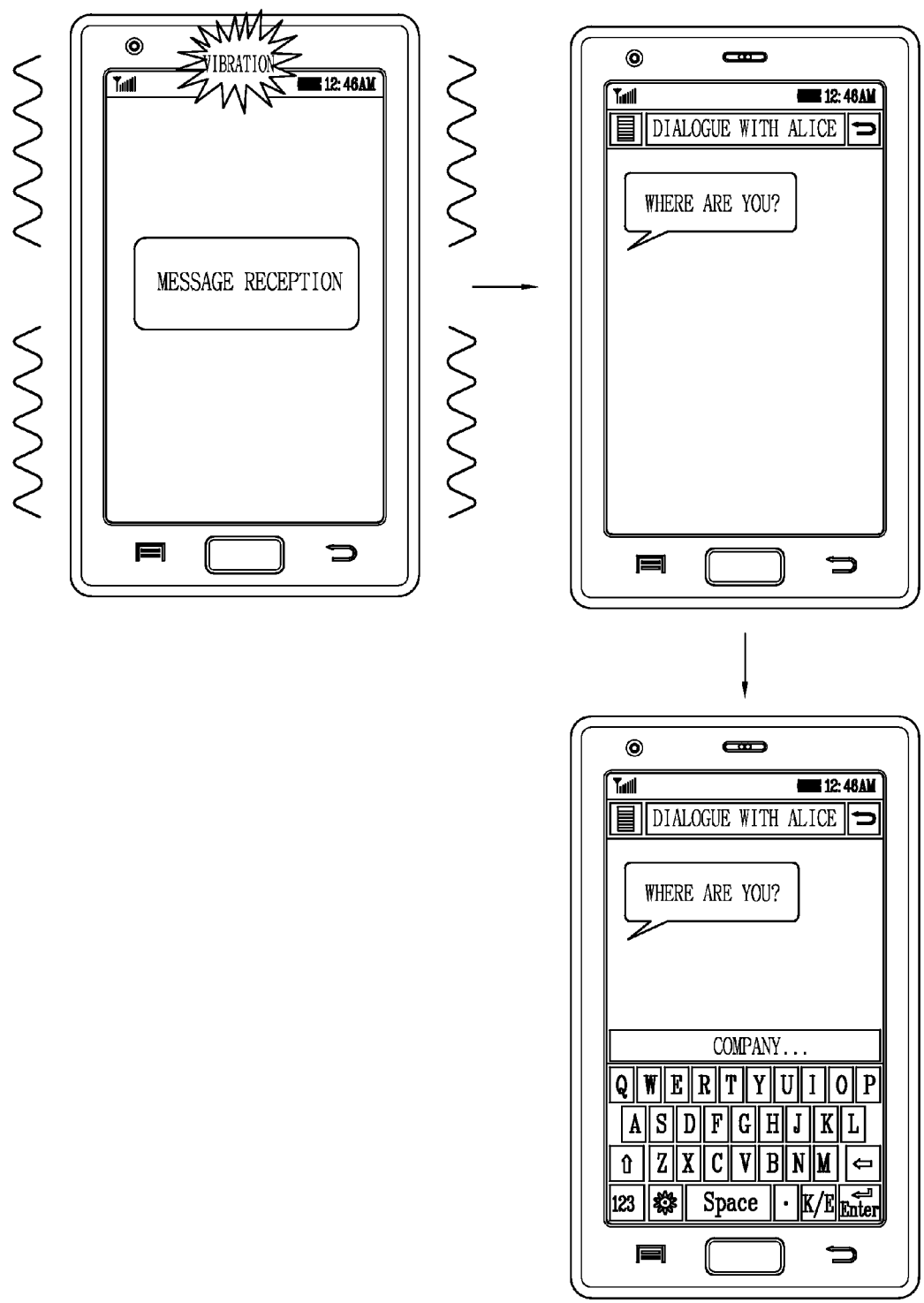
FIG. 9 is an exemplary view illustrating an example of the haptic effect transmission method of FIG. 8.

More specifically, as shown in FIG. 9*a*, upon receipt of a message, a receiving side (e.g., Charley) mobile terminal generates a notification (vibration or sound), and displays a guidance screen related to message reception. Then upon receipt of a request for reading the message from the user (e.g., Charley), the receiving side mobile terminal displays content of the message and information on a sender of the message (e.g., Alice) (S210). Upon receipt of a request for writing a response message from the user, the receiving side mobile terminal displays a soft keypad on the display unit 151.

Upon receipt of touch inputs to keys on the displayed soft keypad from the user (S220), the receiving side mobile terminal generates a vibration pattern signal corresponding to each of the touched keys, and transmits the generated vibration pattern signal. For instance, upon sequential inputs of keys representing "why?" (i.e., "w", "h", "y", "?") or keys representing "쇠 ?" (i.e., "ㅇ", "ㅗ", "ㅐ", "?"), the receiving side mobile terminal generates a vibration pattern signal with respect to each key. The receiving side mobile terminal may also generate a different vibration pattern signal with respect to a specific key (e.g., backspace, delete, space, etc.).

For instance, the vibration pattern may be configured to represent a sound generated when typing is performed on a mechanical keyboard or a typewriter. More specifically, when typing is performed on a mechanical keyboard or a typewriter, some keys generate a relatively high sound whereas other keys generate a relatively low sound. In order to indicate such sounds, keys which generate a high sound may be set to have a high frequency, and keys which generate a low sound may be set to have a low frequency. Alternatively, a vibration pattern 'A' may be generated with respect to consonants, and a vibration pattern 'B' may be generated with respect to vowels. Alternatively, a vibration pattern 'A' may be generated with respect to keys arranged on the left side of a keypad, and a vibration pattern 'B' may be generated with respect to keys arranged on the right side of the keypad. Alternatively, a different vibration pattern may be implemented according to a row and a column on a keypad.

Figure 9B:
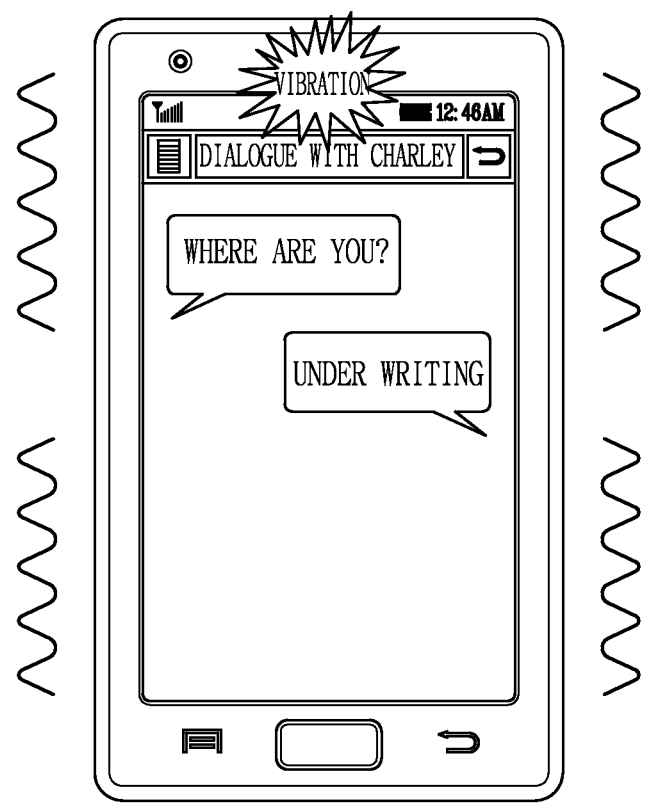

If the receiver (i.e., Charley)'s mobile terminal transmits the vibration pattern signal, as shown in FIG. 9b, content indicating that the other party is writing a message is displayed on a screen of the sender (i.e., Alice)'s mobile terminal. Vibrations corresponding to keys input by the receiver (i.e., Charley) may be generated real time.

Thus, the sender (i.e., Alice) can check whether the receiver (i.e., Charley) has read the message transmitted from the sender, and whether the receiver is writing a response message. Further, the sender can check whether content of the response message is long or short.

Figure 10:
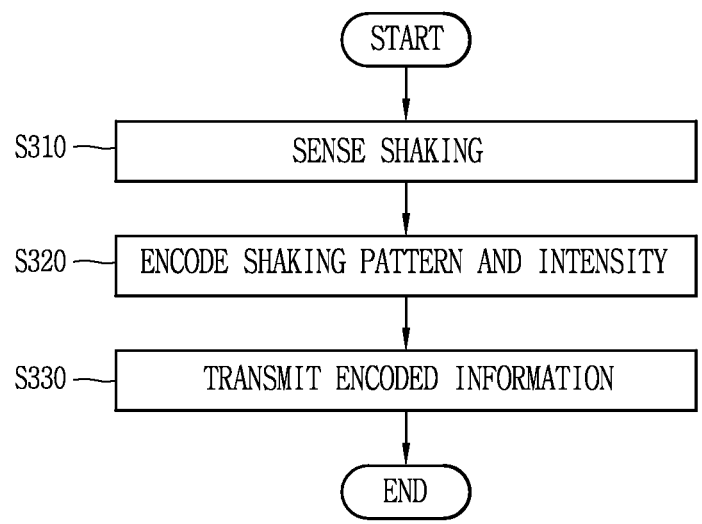
FIG. 10 is a flowchart illustrating a haptic effect transmission method according to a third embodiment of the present invention.
Figure 11:
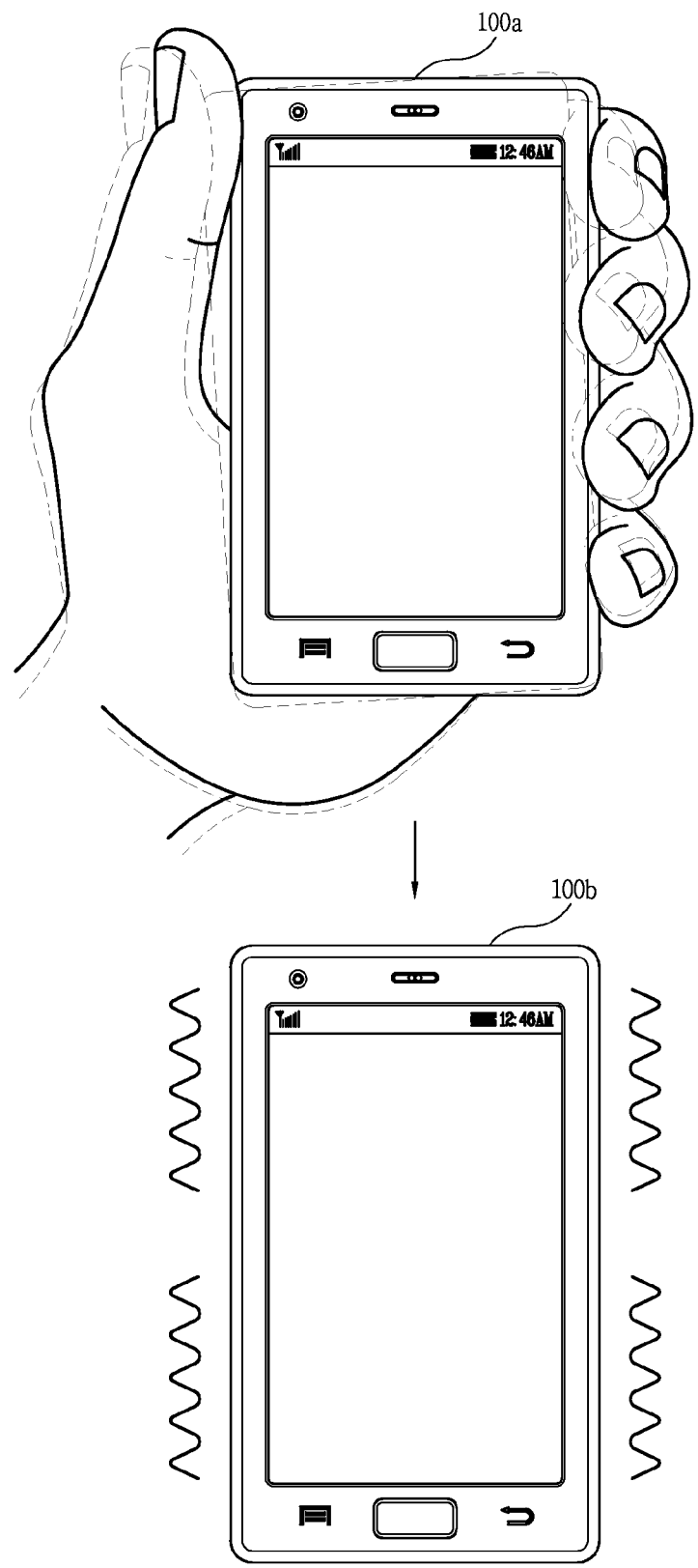
FIG. 11 is an exemplary view illustrating an example of the haptic effect transmission method of FIG. 10.

FIG. 10 is a flowchart illustrating a haptic effect transmission method according to a third embodiment of the present invention. FIG. 11 is an exemplary view illustrating an example of the haptic effect transmission method of FIG. 10. FIG. 12 is an exemplary view illustrating another example of the haptic effect transmission method of FIG. 10. FIG. 13 is an exemplary view illustrating still another example of the haptic effect transmission method of FIG. 10.

Referring to FIG. 10 according to the third embodiment of the present invention, upon sensing of the degree of shaking, the transmitting side mobile terminal encodes a signal according to the sensed degree of shaking, i.e., a size or a pattern of vibration, and then transmits the signal.

More specifically, as shown in FIG. 11, if a user who is holding the transmitting side mobile terminal 100a shakes the transmitting side mobile terminal 100a, the transmitting side mobile terminal 100a senses the degree of shaking (S310). Such sensing on the degree of shaking may be performed by an acceleration sensor, a gyro sensor, etc. A shaking pattern (e.g., information on pitch, roll and yaw and information on a frequency) may be detected through the sensing on the degree of shaking.

The transmitting side mobile terminal 100a encodes information on the detected shaking pattern and a shaking intensity (S320), and transmits the information to the receiving side mobile terminal 100b (S330). In order to distinguish a general shaking occurring in a portable state from the shaking, the transmitting side mobile terminal 100a may compare the sensed value with a threshold value. Only when the sensed value is larger than a threshold value, the transmitting side mobile terminal 100a may encode and transmit information on a shaking pattern and a shaking intensity.

As aforementioned, the third embodiment may be advantageous in the following case. In a case where the transmitting side mobile terminal has sent a message, if the receiving side mobile terminal has not checked the message or has not sent a response message, the transmitting side mobile terminal's user may transmit a notification requesting for the receiving side mobile terminal's check. More specifically, the present invention will be explained with reference to FIG. 12.

Figure 12A:
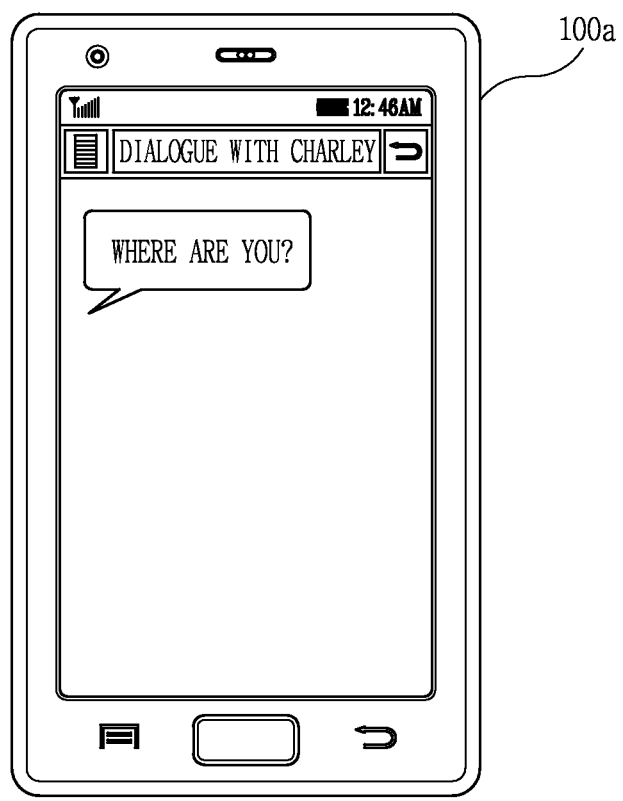
FIG. 12 is an exemplary view illustrating another example of the haptic effect transmission method of FIG. 10.

As shown in FIG. 12a, in a case where the transmitting side (e.g., Alice) mobile terminal 100a which had transmitted a message to a receiver (e.g, Charley) has not received a receipt notification shown in FIG. 7 from the receiver (Charley), or in a case where the transmitting side (e.g., Alice) mobile terminal 100a has not received a vibration indicating that the receiver (Charley) is writing a response message even if the user (Alice) has received a receipt notification, the user (Alice) may shake the transmitting side mobile terminal 100a in a holding state. Then the transmitting side (Alice) mobile terminal 100a may sense the shaking, encode the sensed information, and may transmit the sensed information to the receiving side mobile terminal 100b.

As shown in the left side of FIG. 12b, upon receipt of the message from Alice, the receiving side mobile terminal 100b generates a screen informing the message, together with a vibration. However, the receiving side mobile terminal 100b was not displaying the message, because it has not received an input for reading the message from the user. As aforementioned, if the transmitting side mobile terminal's user shakes the transmitting side mobile terminal 100a in a holding state, the receiving side mobile terminal 100b receives information on a pattern and an intensity of the shaking, and generates a vibration based on the information.

As aforementioned, because the receiving side mobile terminal vibrates in correspondence to shaking by the transmitting side mobile terminal's user who is in a holding state, the two users can perform communication in a more intuitive manner.

Such operation to make the receiving side mobile terminal vibrate in correspondence to shaking in a holding state may be effectively used so that the sender can express his or her feeling as shown in FIG. 13.

More specifically, FIG. 13 shows dialogues between the transmitting side user (e.g., Alice) and the receiving side user (e.g., Charley).

Figure 13A:
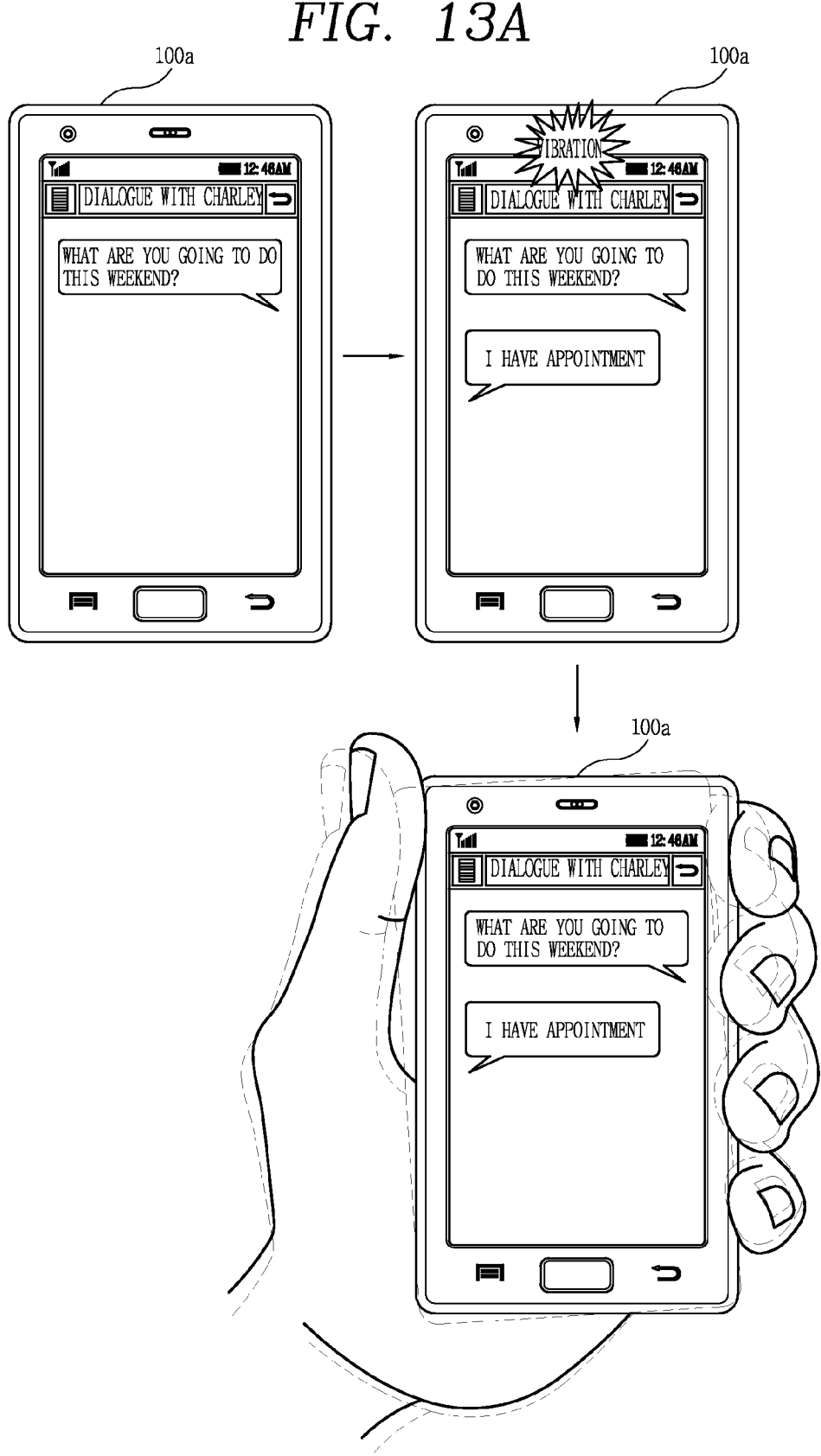
FIG. 13 is an exemplary view illustrating still another example of the haptic effect transmission method of FIG. 10.

As shown in FIG. 13a, Alice sends a message "what are you going to do this weekend?" to the receiver through her mobile terminal (transmitting side mobile terminal) 100a. Then Alice receives, from Charley, a response message "I have an appointment". Alice shakes the transmitting side mobile terminal 100a in a holding state, in order to inform Charley of her anger. The transmitting side mobile terminal 100a senses such shaking, and encodes and sends a signal.

Figure 13B:
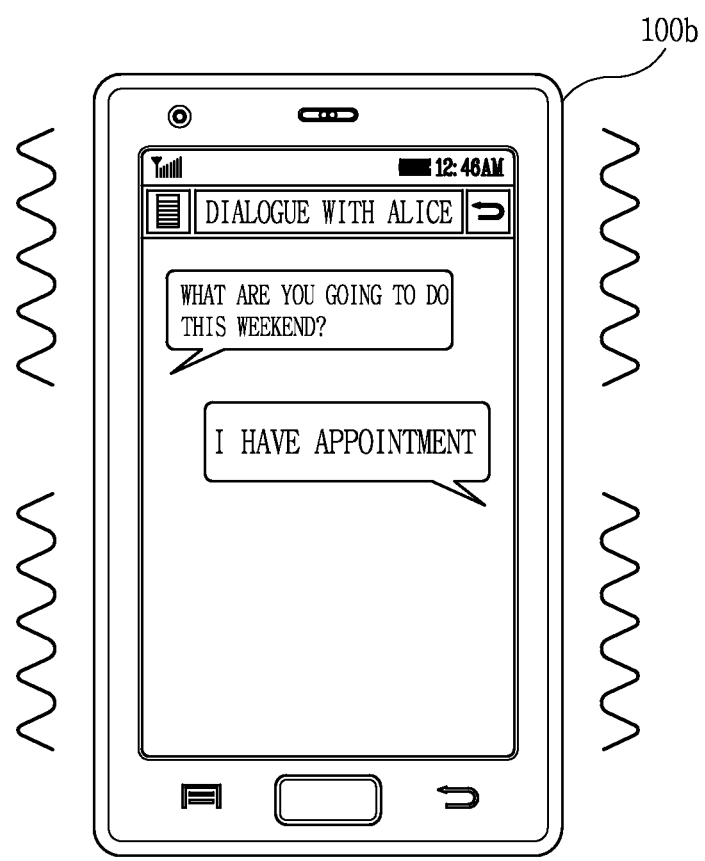

As shown in FIG. 13b, the receiving side (Charley) mobile terminal 100b receives the signal, and generates a vibration according to the receive signal. Thus the receiver (Charley) can see that Alice is in an angry state, in a more intuitive manner.

The example shown in FIG. 13 has an advantage that the sender and the receiver can communicate their feelings with each other more effectively and intuitively.

Figure 14:
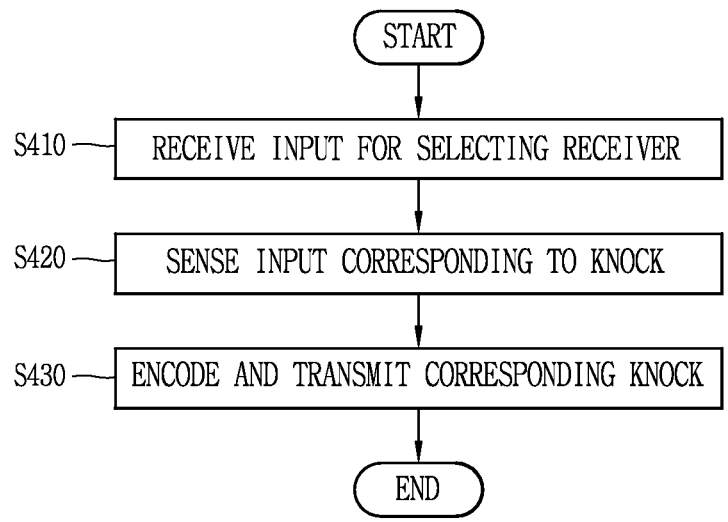
FIG. 14 is a flowchart illustrating a haptic effect transmission method according to a fourth embodiment of the present invention.

FIG. 14 is a flowchart illustrating a haptic effect transmission method according to a fourth embodiment of the present invention, FIG. 15 is an exemplary view illustrating an example of the haptic effect transmission method of FIG.

14, and FIG. 16 is an exemplary view illustrating another example of the haptic effect transmission method of FIG. 14.

Referring to FIG. 14 according to the fourth embodiment, if a transmitting side user knocks on a front surface, a rear surface or a side surface of a transmitting side mobile terminal 100a, the transmitting side mobile terminal 100a senses the knock, encodes a signal corresponding to the knock, and transmits the signal to the receiving side mobile terminal 100b. The receiving side mobile terminal 100b generates a vibration according to the received signal.

More specifically, the transmitting side mobile terminal 100a receives an input for selecting a receiver (S410). If there is a request from the user, the transmitting side mobile terminal 100a may display a list of pre-stored numbers, and may receive a touch input for selecting the receiver from the list. Alternatively, the transmitting side mobile terminal 100a may display a keypad for inputting a number, and may receive a number from the user through a touch input on the keypad.

The transmitting side mobile terminal 100a senses an input corresponding to the user's knock (i.e., strong touch input or impact) on the front surface, the rear surface or the side surface (S420). Such knock is sensed by measuring an instantaneous acceleration using an acceleration sensor, and by obtaining the size of force based on the instantaneous acceleration. Generally, such knock is generated by applying impacts consecutively two times, which may be distinguished from a general impact. For instance, an impact applied to a mobile terminal is generated when the mobile terminal falls. In this case, such impact can be distinguished from a knock, because it is applied to the mobile terminal only once. Especially, a knock is generated when an impact is applied consecutively at least twice within a predetermined time. Therefore, in order to distinguish such knock from a general impact, the transmitting side mobile terminal 100a may check whether two impacts have consecutively occurred within a predetermined time. In a case where the mobile terminal 100a falls from a high altitude, the mobile terminal 100a may contact the ground and then bounce off to fall down. In this case, the mobile terminal 100a may mistake such impacts for a knock, because such impacts have been applied thereto consecutively at least twice. However, in case of such impacts, the first impact is very strong, whereas the second impact is a little weak. If a size difference between two consecutive impacts is very large, such impacts may not be a knock. Thus, in order to distinguish impacts from a knock, the mobile terminal may check whether a size difference between consecutively-applied impacts exceeds a threshold value or not.

Upon sensing of a knock, the transmitting side mobile terminal 100a may encode an impact corresponding to the knock into a signal, and may transmit the signal to the receiving side mobile terminal (S430).

An example to which the fourth embodiment is applied will be explained in more detail with reference to FIG. 15.

Figure 15A:
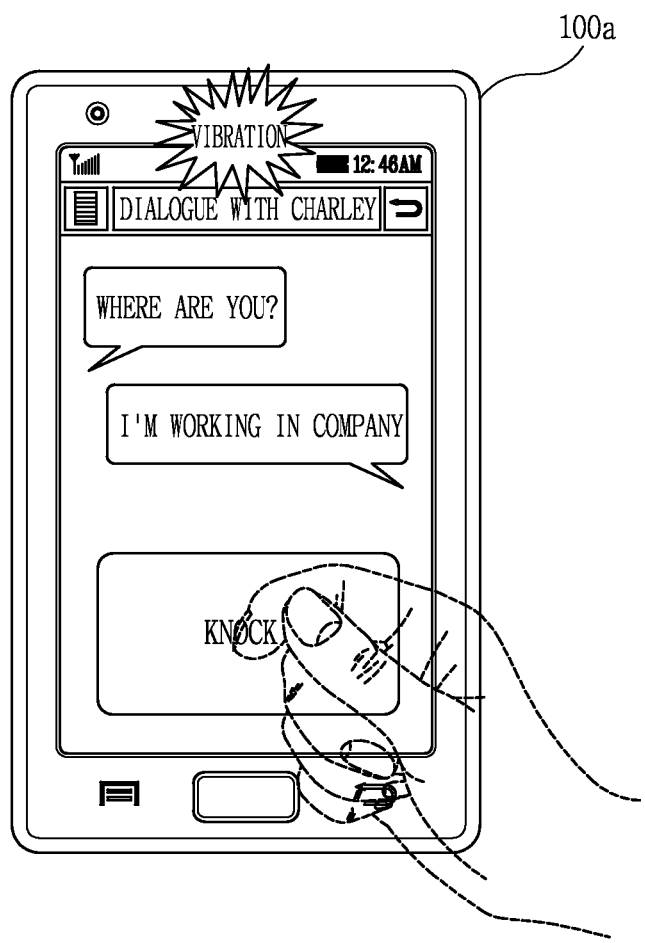
FIG. 15 is an exemplary view illustrating an example of the haptic effect transmission method of FIG. 14.

As shown in FIG. 15a, a transmitting side user (e.g., Alice) has selected a receiver (e.g., Charley). The transmitting side mobile terminal 100a displays a screen for exchanging messages with the receiver. Under such state, if the transmitting side user knocks on (or applies a knocking impact ('TOCK-TOCK') onto) a front surface, a rear surface or a side surface of the transmitting side mobile terminal 100a, the transmitting side mobile terminal 100a encodes an impact corresponding to the knock into a signal, and transmits the signal to the receiver's mobile terminal.

Then as shown in FIG. 15b, the receiving side (Charley) mobile terminal 100b displays a message indicating a knock generated from the sender (Alice), and generates a vibration corresponding to the knock performed by the sender. If the receiver (Charley) applies a touch input for checking the knock, the receiving side mobile terminal 100b may display a screen for inputting messages.

Another example to which the fourth embodiment is applied will be explained in more detail with reference to FIG. 16.

Figure 16A:
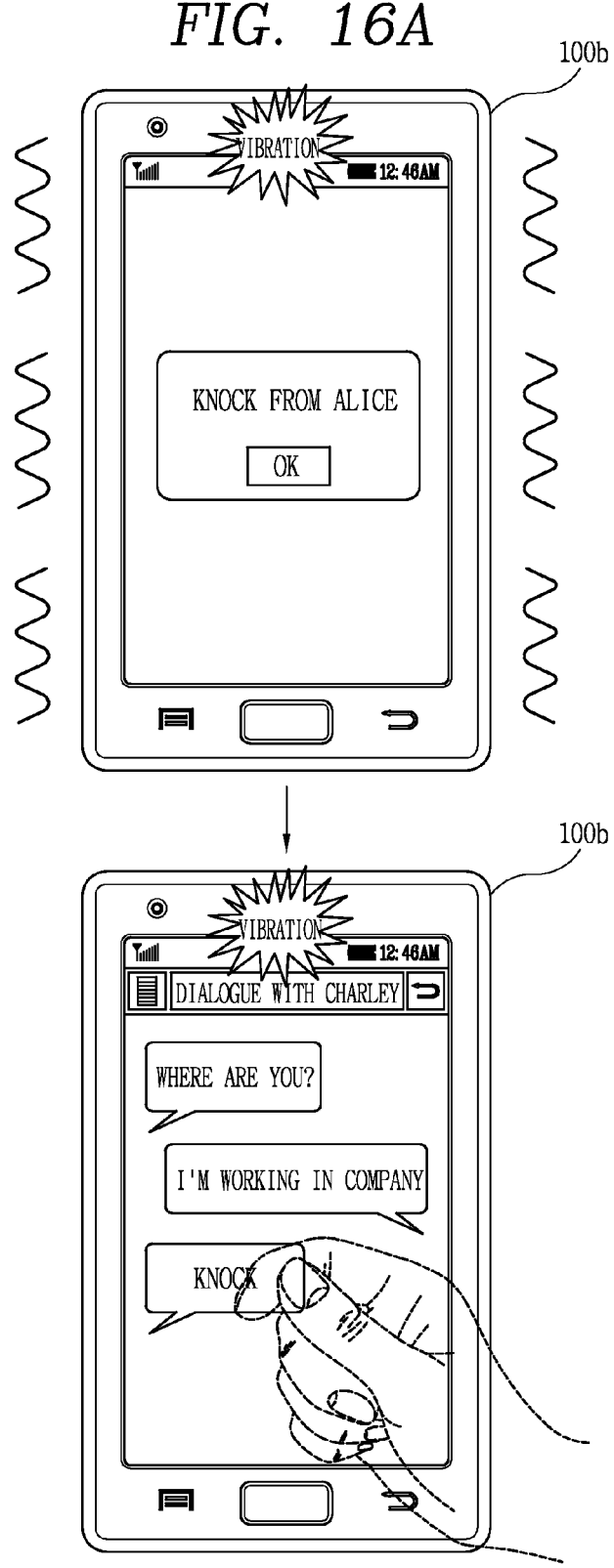
FIG. 16 is an exemplary view illustrating another example of the haptic effect transmission method of FIG. 14.

FIG. 16a illustrates the receiving side (Charley) mobile terminal 100b. The receiving side (Charley) mobile terminal 100b displays, on a screen, a message indicating a knock generated from the sender (Alice). Then the receiving side generates a vibration corresponding to the knock performed by the sender. If the receiver (Charley) applies a touch input for checking the knock, the receiving side mobile terminal 100b may display a screen for inputting messages. If the receiver (Charley) applies a knocking impact ('TOCK-TOCK') on the screen as a response to the knock, the receiving side mobile terminal 100b encodes a signal by sensing the impact, and transmits the encoded signal to the transmitting side mobile terminal.

Figure 16B:
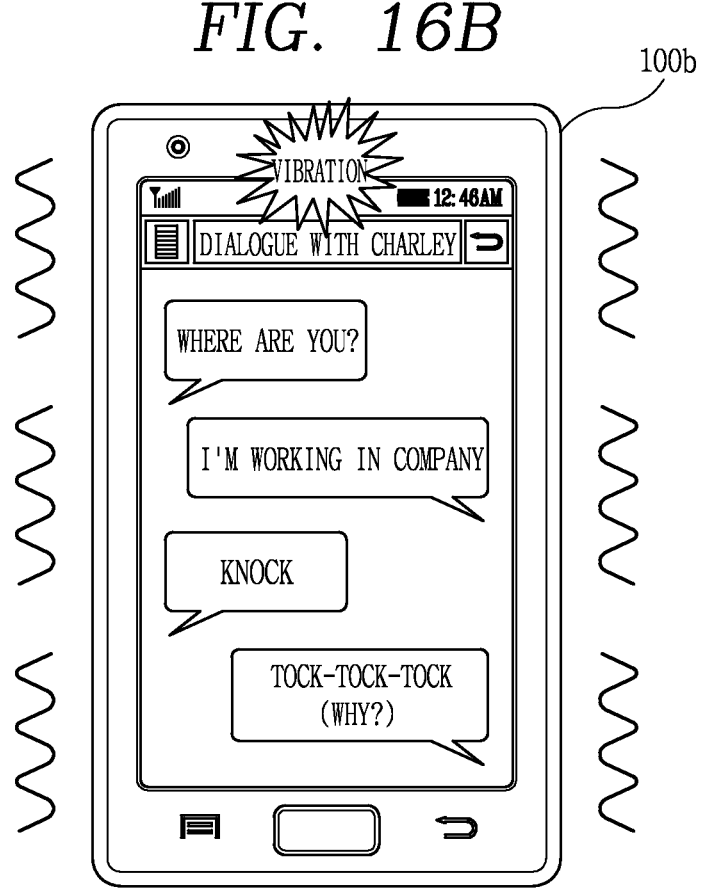

As shown in FIG. 16b, upon receipt of the signal as a response to the knock generated from the sender, the transmitting side (Alice) mobile terminal 100a may encode the signal, and may generate a vibration corresponding to 'TOCK-TOCK-TOCK' according to the encoded signal. The transmitting side mobile terminal 100a may display, on a screen, a text corresponding to the 'TOCK-TOCK-TOCK' (e.g., "why?"). The displayed text may be an optimum word selected through situation recognition. That is, if the received signal decoded by the transmitting side mobile terminal has a large size, it is determined that the receiver wishes to know the reason of the knock. Therefore, the transmitting side (Alice) mobile terminal 100a may display a text such as "why?". On the other hand, if the signal size is small, it is determined that the receiver is in a situation where it is hard to answer right now. Therefore, the transmitting side (Alice) mobile terminal 100a may display a text such as "I am busy now, why?".

Figure 17:
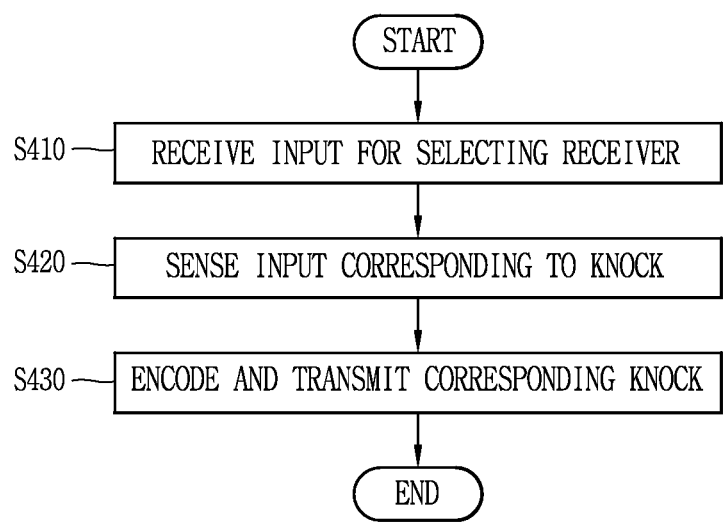
FIG. 17 is a flowchart illustrating a haptic effect transmission method according to a fifth embodiment of the present invention.
Figure 18A:
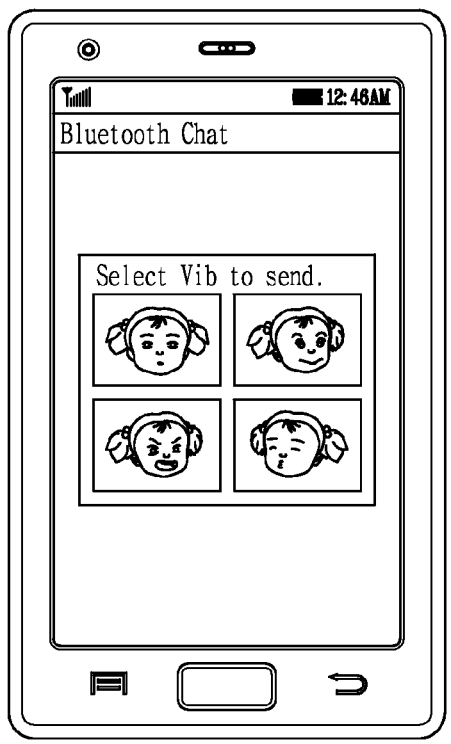
FIG. 18 is an exemplary view illustrating an example of the haptic effect transmission method of FIG. 17.
Figure 18A:
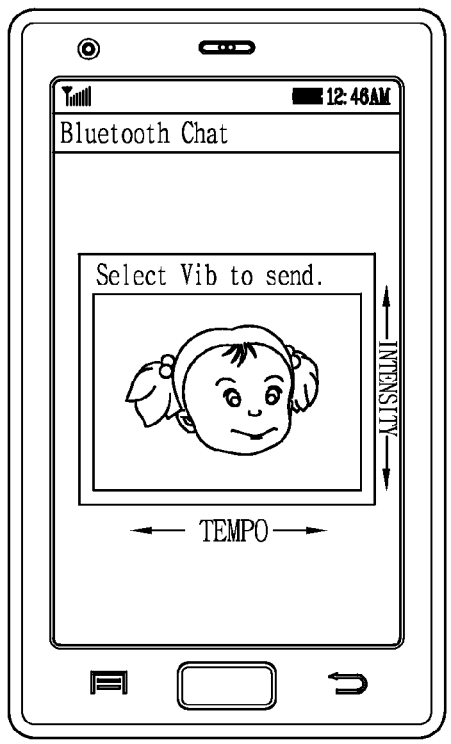

FIG. 17 is a flowchart illustrating a haptic effect transmission method according to a fifth embodiment of the present invention, and FIG. 18 is an exemplary view illustrating an example of the haptic effect transmission method of FIG. 17.

As can be seen from FIG. 17, in the fifth embodiment according to the present invention, upon receipt of an input for selecting one of a plurality of avatars corresponding to various emotional states, the selected avatar is transmitted to the receiver. Then the receiver's mobile terminal generates a vibration corresponding to the selected avatar's emotion. This will be explained in more detail.

Firstly, a transmitting side (e.g., Alice) mobile terminal 100a receives an input for a receiver (S510). If there is a request from the user, the transmitting side mobile terminal 100a may display a list of pre-stored numbers, and may receive a touch input for selecting the receiver from the list. Alternatively, the transmitting side mobile terminal 100a may display a keypad for inputting a number, and may receive a number from the user through a touch input on the keypad.

The transmitting side mobile terminal 100a displays a screen for inputting messages. In this case, the transmitting side mobile terminal 100a may display a menu for providing the receiver with vibration effects.

If the transmitting side user selects a menu for providing the receiver with vibration effects, the transmitting side mobile terminal displays avatars corresponding to a plurality of emotional states. Such emotional states may be gaiety, laughter, sadness, anger, etc. More specifically, such emotional states may further include sleepiness, hunger, irritation, boredom, excitement, etc.

The mobile terminal may display each avatar corresponding to each emotional state. Alternatively, as shown in the left image of FIG. 18a, the mobile terminal may display only some avatars corresponding to representative emotional states. In this case, if there is not an avatar corresponding to a desired emotional state, the transmitting side user may search for other avatars from a server, and download the searched avatars.

In a case where only some avatars have been displayed, upon receipt of an input for selecting one of the avatars, the mobile terminal may display an edition screen for adjusting a vibration to be generated by the selected avatar, as shown in the right image of FIG. 18a. For instance, as shown in the right image of FIG. 18a, a scroll bar for adjusting a tempo, i.e., a vibration frequency may be displayed on the lower side of the avatar on a horizontal axis, and a scroll bar for controlling a vibration intensity may be displayed on the right side of the avatar on a vertical axis. Under such configuration, a user can increase or decrease the vibration tempo by controlling the scroll bar on the horizontal axis, or may increase or decrease the vibration intensity.

If the transmitting side user has completed the adjustment of vibration through the edition menu, the mobile terminal may play the avatar to be sent. If the avatar is laughing, a vibration may be generated together with a laughter sound. The vibration may be generated rhythmically together with the laughter sound. As aforementioned, if the user plays the avatar after increasing the vibration tempo and the vibration intensity, a loud laughter sound may be rapidly output, and a strong vibration may be rapidly generated to a rhythm of the laughter sound.

Finally, if the transmitting side user requests for transmission, the transmitting side mobile terminal 100a transmits, to the receiving side mobile terminal, a message including a signal corresponding to the avatar (S530).

Figure 18B:
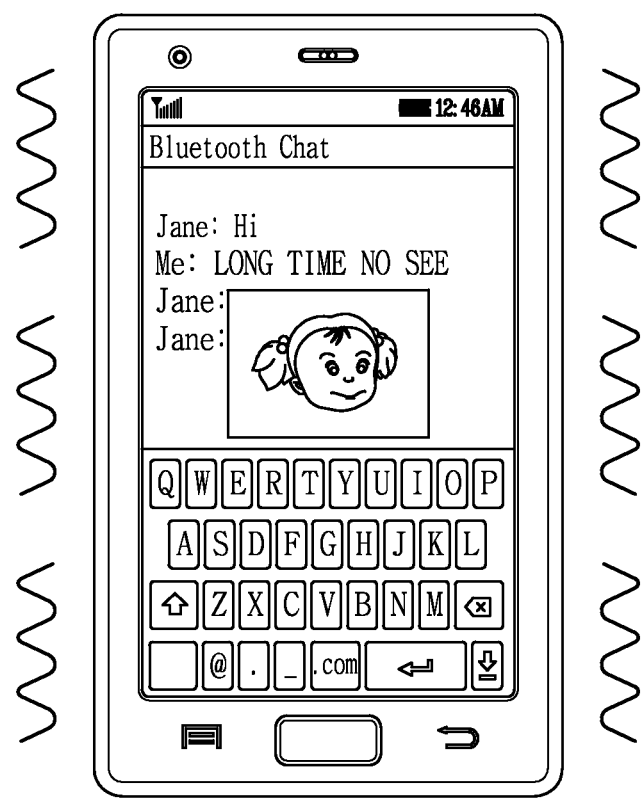

As shown in FIG. 18b, if the receiving side mobile terminal 100b receives the message, the avatar is played. If the avatar is laughing, a vibration may be generated together with a laughter sound. If the receiving side mobile terminal 100b receives the message in a state where it does not have the avatar, it may automatically download the avatar from a server. If the receiving side mobile terminal 100b downloads the avatar, other mobile terminals possessed by the receiving side user may automatically download the avatar. Also, mobile terminals of other user may automatically download the avatar, the other user related to the receiving side user within a social network service that the receiving side user has joined. That is, in a case where the receiving side mobile terminal downloads the avatar, a server of the social network service may notify the downloading to mobile terminals of other related user. Then the mobile terminals of other related user may download the avatar from the server according to the notification.

Figure 19:
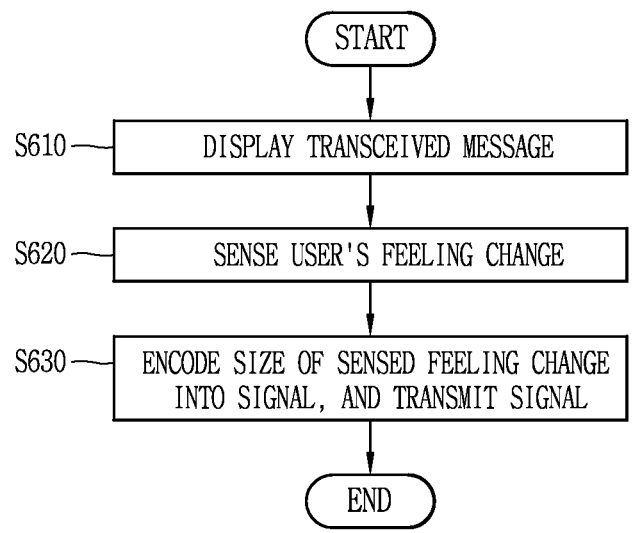
FIG. 19 is a flowchart illustrating a haptic effect transmission method according to a sixth embodiment of the present invention.

FIG. 19 is a flowchart illustrating a haptic effect transmission method according to a sixth embodiment of the present invention.

Referring to FIG. 19, in the sixth embodiment, while displaying messages transceived (transmitted and received) (S610), a transmitting side mobile terminal 100a captures a user's facial expression using a camera disposed on a front surface thereof, and senses whether the user's facial expression has changed (S620). Such sensing may be sensing on whether a mouth shape has changed or an eye shape has changed. Alternatively, such sensing may be sensing on whether a face color has changed, eyebrows have changed, or the tip of a nose has changed. If the user's eyes are drooping eyes and the user's mouth has increased in size, it may be sensed that the user is laughing. Alternatively, if the user's eyes are drooping eyes but the user's mouth has not increased in size, it may be sensed that the user feels sad. Still alternatively, if the user's eyebrows have been raised and the user's eyes have increased in size, it may be sensed that the user feels curious.

Upon sensing of the user's feeling, a vibration pattern for indicating the sensed feeling may be selected, and a vibration size having the selected pattern may be determined. Then a signal indicating the determined vibration may be encoded to thus be transmitted to the receiving side mobile terminal.

While the present invention has been shown and described in connection with the exemplary embodiments, it will be apparent to those skilled in the art that modifications and variations can be made without departing from the spirit and scope of the invention as defined by the appended claims.

The invention claimed is:

1. A haptic transmission method by a transmitting side mobile terminal, comprising:
   displaying a screen for receiving an input of a receiver;
   when an input for selecting the receiver is completed, displaying a screen for receiving an input of content to be transmitted;
   determining whether a receipt notification has not been received from the receiver after transmitting a message to the receiver;
   providing a first vibration, to the transmitting side mobile terminal, indicating the receipt notification whenever the receipt notification is received;
   determining whether the transmitting side mobile terminal is in a holding state in a hand of a user using a proximity sensor whenever the receipt notification has not been received;
   detecting an impact or a touch input corresponding to shaking the transmitting side mobile terminal by activating an acceleration sensor or a gyro sensor whenever the receipt notification has not been received and the transmitting side mobile terminal is in the holding state;
   generating a vibration pattern signal on the basis of the detected impact or the detected touch input when the impact or the touch input is detected whenever the receipt notification has not been received; and
   providing a second vibration, to the receiver, corresponding to the vibration pattern signal by transmitting a message including the vibration pattern signal to the receiver,
   wherein the detected impact or the detected touch input is a shaking pattern and a shaking intensity.

2. The method of claim 1, wherein an indicator for emoticons is displayed on the screen for receiving an input of content to be transmitted,
   wherein when the indicator is touched, a plurality of emoticons are displayed, and
   wherein when an input for selecting a specific emoticon among the plurality of emoticons is received, a vibration pattern signal is generated based on the specific emoticon.

3. The method of claim 2, wherein when an input for selecting the specific emoticon is received, an indicator for adjusting a vibration tempo and a vibration intensity according to the emoticon is displayed, and wherein when a user inputs one of the vibration tempo and the vibration intensity, a vibration pattern signal is generated based on the adjusted tempo and intensity, and then is transmitted.

4. The method of claim 1, wherein the impact detection is performed by detecting an impact occurring when a user's knock is detected on a front surface, a rear surface or a side surface of on the transmitting side mobile terminal, and
wherein the user's knock is detected by measuring acceleration between consecutive knocks.

5. The method of claim 1, wherein in the step of generating a vibration pattern signal on the basis of the touch input, whenever numeric keys or text keys are consecutively input, a vibration pattern signal corresponding to each of the input numeric or text keys is generated.

6. The method of claim 5, wherein in the step of generating a vibration pattern signal corresponding to each of the input numeric or text keys, a different vibration pattern signal is generated according to whether an input text key is a consonant or a vowel, or a different vibration pattern signal is generated according to a position of an input text key on a keypad, the position indicating a row and a column.

7. The method of claim 1, wherein after displaying the screen for receiving an input of content to be transmitted, whether a user's facial expression has changed or not is sensed by a camera, and
wherein a vibration pattern signal indicating a user's feeling is generated according to the change of facial expression, and is transmitted.

8. The method of claim 1, wherein the first vibration indicating that the receiver is writing a response message.

9. The method of claim 1, wherein generating the vibration signal is performed when the shaking intensity is greater than a threshold value in order to distinguish a general shaking occurring in a portable state from the shaking pattern.

10. The method of claim 1, wherein the shaking pattern comprises information on pitch, roll and yaw and information on a frequency.

11. A mobile terminal, comprising:
a touch screen configured to display a screen for inputting a receiver, and configured to display a screen for inputting content to be transmitted when an input for selecting the receiver is completed; and
a controller, configured to:

determine whether a receipt notification has not been received from the receiver after transmitting a message to the receiver,
provide a first vibration, to the transmitting side mobile terminal, indicating the receipt notification that whenever the receipt notification is received,
determine whether the transmitting side mobile terminal is in a holding state in a hand of a user using a proximity sensor whenever the receipt notification has not been received,
detect an impact or a touch input corresponding to shaking the transmitting side mobile terminal by activating an acceleration sensor or gyro sensor whenever the receipt notification has not been received and the transmitting side mobile terminal is in the holding state,
generate a vibration pattern signal on the basis of the detected impact or the detected touch input when the impact or the touch input is detected whenever the receipt notification has not been received, and
provide a second vibration to the receiver corresponding to the vibration pattern signal by transmitting a message including the vibration pattern signal to the receiver,
wherein the detected impact or the detected touch input is a shaking pattern and a shaking intensity.

12. The mobile terminal of claim 11, wherein the impact detection is performed by detecting an impact occurring when the transmitting side mobile terminal is shaken.

13. The mobile terminal of claim 11, wherein the impact detection is performed by detecting an impact occurring when a user knocks on the transmitting side mobile terminal.

14. The mobile terminal of claim 11, wherein in the step of generating a vibration pattern signal on the basis of the touch input, whenever numeric keys or text keys are consecutively input, a vibration pattern signal corresponding to each of the input numeric or text keys is generated.

15. The mobile terminal of claim 14, wherein in the step of generating a vibration pattern signal corresponding to each of the input numeric or text keys, a different vibration pattern signal is generated according to whether an input text key is a consonant or a vowel, or a different vibration pattern signal is generated according to a position of an input text key on a keypad, the position indicating a row and a column.

* * * * *